E. W. Sperry,

Bending Sheet Metal.

No. 85,542.    Patented Jan. 5, 1869.

EGBERT W. SPERRY, OF WOLCOTTVILLE, CONNECTICUT.

Letters Patent No. 85,542, dated January 5, 1869.

IMPROVEMENT IN MACHINE FOR PRODUCING UNIFORM TWIST IN TABLE-CUTLERY, SPOONS, &c.

The Schedule referred to in these Letters Patent and making part of the same.

*To all whom it may concern:*

Be it known that I, EGBERT W. SPERRY, of Wolcottville, county of Litchfield, and State of Connecticut, have invented certain new and useful Improvements in Machine for Producing Twist in Sheet-Metal Ware; and to enable others skilled in the art to make and use the same, I will proceed to describe by referring to the drawings, in which the same letters indicate like parts in each of the figures.

The nature of this invention consists in arranging mechanism in practical forms, so that by the use thereof a symmetrical and uniform twist can be easily and quickly produced in a portion of a knife, fork, spoon, or ladle-handle, made from sheet-metal.

The object of this invention is to produce uniformity in the twist, and to accomplish it in the least amount of time, and produce a rich ornamental appearance to the goods.

In the accompanying drawings—

Figure 1:
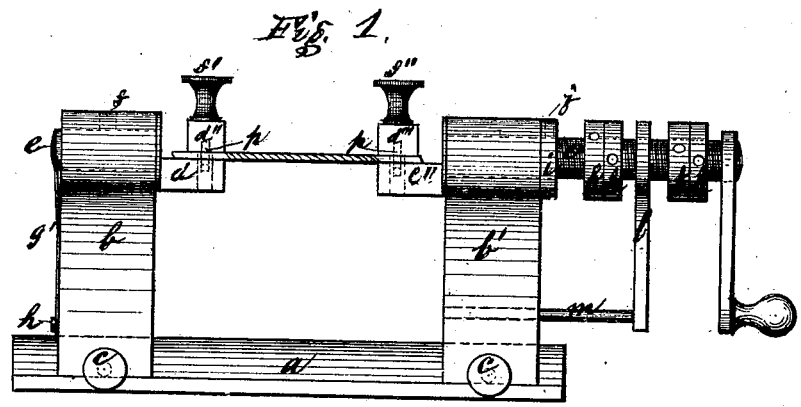
Figure 1 is a side elevation.
Figure 2:
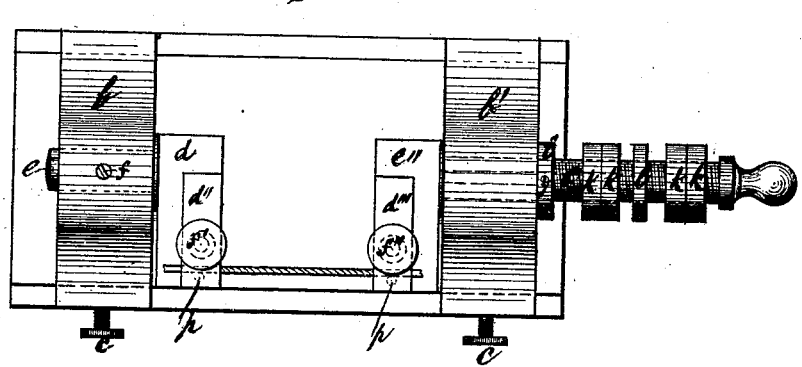
Figure 2 is a top view thereof.

*a* is a bed-plate, having dovetail or other suitably-shaped ways, to which the head-stocks *b b'* are fitted, so as to move closely and freely thereon, each of which is provided with set-screws, *c*, for securing them (either one or both) in any desired fixed position.

*d d''* are clamp-plates, one of which, *d*, is secured or formed on the spindle *e*, the face of which is at or near the centre-line thereof.

This spindle *e* is fitted to a bearing in the head-stock *b*, and is secured so as to move back and forth in a horizontal direction, and is prevented from turning by a spline or screw, *f*.

*g* is a spring, secured to the head-stock by a screw, *h*. The upper end of this spring enters a notch in the outer end of the spindle *e*, the office of which is to hold the jaw or plate *d* closely back against the stock *b*, and allow it to be drawn forward to compensate for contraction of metal while the twist is being produced.

*e'* is a screw-spindle, having a crank secured upon one end, and the plate *e''* secured at or near the centre, at the other end.

This spindle is secured closely, and turns freely in the stock *b'*, by a collar, *j*, and screw *i*.

*k* are jamb-nuts, arranged upon the screw-spindle *e'*.

*l* is a dog, fitted closely, and works freely upon the screw-spindle *e'*, having a guide-bar, *m*, to prevent it from turning by the action of the screw *e'*, two jamb-nuts being arranged upon each side of the nut or dog *l*, so that the amount or extent of the twist can be limited or fixed by the jamb-nuts.

The jaws *d'' d'''* are secured to the plates *d e''*, so as to open and close by screws *f' f''*, and are held in their proper position by dowel-pins *n*.

Now, it will be seen that a longer or shorter piece may be secured between the jaws by moving back or forward one of the stocks, *b*, and that the amount of twist can be regulated by the jamb-nuts, so as to produce a half twist or more, as desirable; as, for instance, twist the shank of a knife or fork so that the blade or tines will be in a right-angle position with the handle, thus producing a uniform symmetrical twist in a perfect and rapid manner, with comparatively inexperienced workmen.

I believe I have thus shown the nature, construction, and advantage of this invention, so as to enable others skilled to make and use the same therefrom.

I claim, in a machine specially designed for producing uniform twist in table-cutlery, spoons, &c., the vibrating spindle *e*, plate *d*, spring *g*, plate *e''*, and screw *e'*, working within the stock *b'*, with the adjusting-nuts *k* and collar *l*, for fixing the starting and stopping-points, or the amount of twist desired to be produced, with the clamps *d'' d'''* for holding the work, all arranged and operating substantially as described.

E. W. SPERRY. [L. S.]

Witnesses:
E. W. BLISS,
J. W. BLISS.